United States Patent [19]

Seto

[11] Patent Number: 5,358,299
[45] Date of Patent: Oct. 25, 1994

[54] SUN VISOR HOLDER

[75] Inventor: Takumi Seto, Toyota, Japan

[73] Assignee: Neo-Ex Lab. Inc., Toyota, Japan

[21] Appl. No.: 145,088

[22] Filed: Nov. 3, 1993

[30] Foreign Application Priority Data

Nov. 6, 1992 [JP] Japan .................. 4-083131

[51] Int. Cl.⁵ .............................................. B60J 3/00
[52] U.S. Cl. ................................... 296/97.9; 411/41
[58] Field of Search .......................... 296/97.9, 97.12;
411/41

[56] References Cited

U.S. PATENT DOCUMENTS

| | | | |
|---|---|---|---|
| 3,105,407 | 10/1963 | Rapata | 411/41 |
| 3,164,418 | 1/1965 | Biesecker | 411/41 X |
| 4,804,303 | 2/1989 | Statkus | 411/41 |
| 5,098,151 | 3/1992 | Peterson | 296/97.9 |
| 5,163,795 | 11/1992 | Benoit et al. | 411/41 X |
| 5,236,240 | 8/1993 | Burns et al. | 296/97.9 |

Primary Examiner—Joseph Pape
Attorney, Agent, or Firm—Dennison, Meserole, Pollack & Scheiner

[57] ABSTRACT

A sun visor holder for supporting a supporting bar of a sun visor includes a main body and a plug member formed on the main body and insertable into a mounting opening formed on an automobile body. The plug member has a slit for vertically splitting same and has a through bore into which a fastening member is received. The through bore includes a tapered surface extending along the slit. The plug member is flared by virtue of the slit so as to be held in the mounting opening when the fastening member is inserted into the through bore of the plug member fitted to the mounting opening formed on the automobile body, whereby the main body is fixed to the automobile body.

5 Claims, 3 Drawing Sheets

SUN VISOR HOLDER

BACKGROUND OF THE INVENTION

The present invention relates to a sun visor holder for stably holding a supporting arm of a sun visor, and particularly to a sun visor holder having a specific mounting mechanism for mounting same on an automobile body.

As shown in FIG. 7, a sun visor 101 for an automobile is generally rotatably connected to an L-shaped supporting arm 103 at one end portion thereof. The supporting arm 103 is mounted on a roof panel 102 of an automobile body, thereby mounting the sun visor 101 on the roof panel 102. Provided on the other end portion of the sun visor 101 is a supporting bar 104 which is held by a sun visor holder 105 fixedly mounted on the roof panel 102. With this arrangement, the sun visor 101 can be rotated around the supporting arm 103 and the holding bar 104.

FIG. 8 is sectional view showing a conventional sun visor holder 105 mounted on the roof panel 102. As shown therein, the sun visor holder 105 includes a main body 105A. Formed on the lower surface of the main body 105A is a hook-like holding portion 111 which may receive the supporting bar 104 therein as the sun visor holder 105 is affixed to the roof panel 102. The main body 105A includes a positioning pin 106 which projects upwardly from the upper surface thereof. The main body 105A also includes a vertical stepped bore 109 formed therethrough.

The sun visor holder 105 is located on the roof panel 102 by inserting the positioning pin 106 into a through hole 107 formed on the roof panel 102. The sun visor holder 105 is then affixed to the roof panel 102 by screwing a threaded fastener 110 into a threaded bore 108 formed on the roof panel 102 through the stepped bore 109. As will be appreciated, the through hole 107 and the threaded bore 108 are previously formed on the roof panel 102 so as to align with the positioning pin 106 and the stepped bore 109, respectively.

A problem usually associated with the conventional sun visor holder 105 is that since the sun visor holder 105 is affixed to the roof panel 102 by the threaded fastener 110, the threaded fastener 110 may loosen due to vibrations from the automobile body, thereby causing chattering of the sun visor holder 105. This may lead to poor performance of the sun visor holder 105, thereby causing undesirable vibrations of the sun visor 101. In extreme case, loosening of the threaded fastener 110 may lead to a completely falling off of the sun visor holder 105 from the roof panel 102.

Another problem usually associated with the prior art sun visor holder 105 is that the threaded fastener 110 is screwed to affix the sun visor holder 105 to the roof panel 102, thereby increasing work time for mounting the sun visor holder 105 on the roof panel 102.

SUMMARY OF THE INVENTION

It is an object of the invention to provide a sun visor holder which can be easily mounted on an automobile body without using a threaded fastener and which eliminates the problems associated with the conventional sun visor holder.

The present invention provides a sun visor holder for supporting a supporting bar of a sun visor mounted on an automobile body, which comprises a main body having a holding portion for receiving the supporting bar of the sun visor, and a plug member formed on the main body and insertable into a mounting opening formed on the automobile body, the plug member having a slit for vertically splitting same and having a through bore into which a fastening member is received, the through bore including a tapered surface extending along the slit, the plug member being adapted to flare by virtue of the slit so as to be held in the mounting opening when the fastening member is inserted into the through bore of the plug member fitted to the mounting opening formed on the automobile body, whereby the main body is fixed in the mounting opening of the automobile body.

An important feature of the present invention is that the sun visor holder remains fixed to the automobile body. This may effectively prevent the chattering of the sun visor holder due to the vibrations from the automobile body.

Another feature of the present invention is that a threaded fastener is is not used. This may extremely reduce the work time for mounting the sun visor holder on the automobile body.

The present invention will become more fully apparent from the claims and the description as it proceeds in connection with the drawings.

DETAILED DESCRIPTION OF THE PREFERRED EMBODIMENT

A preferred embodiment of a sun visor holder according to the present invention will now be described with reference to FIGS. 1 to 6.

Figure 1:
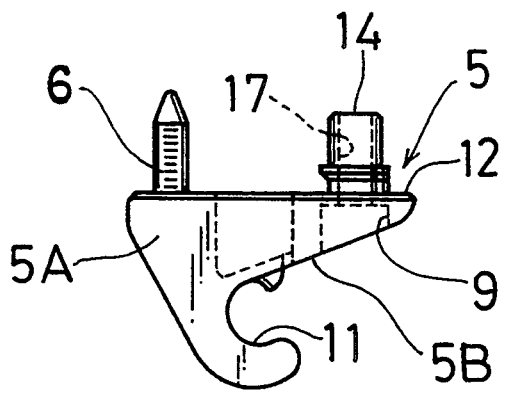
FIG. 1 is a side view of a sun visor holder according to the present invention.
Figure 2:
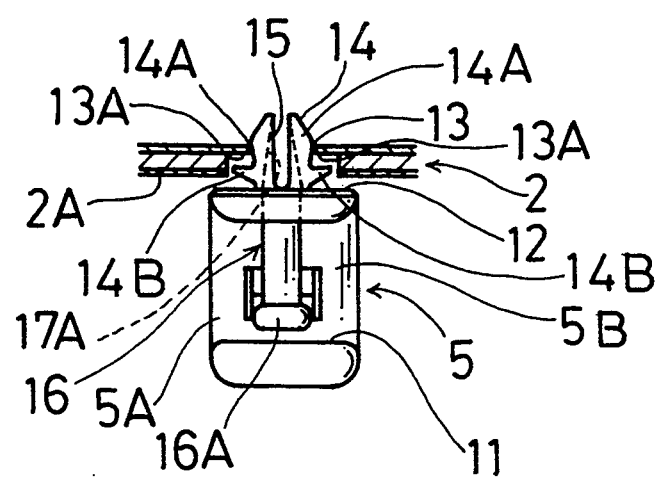
FIG. 2 is an elevational view of the sun visor holder showing the process of its mounting onto a roof panel of an automobile body.
Figure 3:
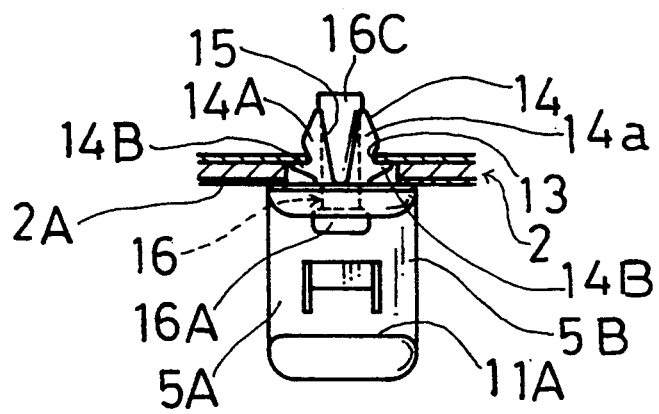
FIG. 3 is an elevational view of the sun visor holder mounted on the roof panel of the automobile body.

As shown in FIGS. 1 to 3, a sun visor holder 5 includes a main body 5A having a slanted surface 5B. Formed on the lower surface of the main body 5A is a hook-like holding portion 11 for receiving a supporting bar (not shown) of a sun visor. The main body 5A has a vertical positioning pin 6 projecting upwardly from an upper surface 12 thereof and a vertical stepped bore 9 formed therethrough. The stepped bore 9 has a substantially rectangular configuration in cross section.

The main body 5A of the sun visor holder 5 also has a vertical plug 14 integrally formed on the upper surface 12 thereof and having a rectangular configuration in cross section. The plug 14 includes a through bore 17 having a rectangular configuration in cross section. The through bore 17 is aligned with the stepped bore 9 so as to receive a fastener 16 to be described hereinafter. As shown in FIG. 2, the plug 14 also includes a vertical slit 15 for lateral flaring flexture thereof. The through bore 17 includes a pair of laterally opposed tapered surfaces 17A extending along the vertical slit 15. When the fastener 16 is inserted into the through bore 17, the fastener 16 cooperates with the tapered surfaces 17A of the through bore 17 to produce a lateral biasing force in the plug 14. The biasing force permits lateral flaring of the plug 14. As will be easily understood, the flaring of the plug 14 is smoothly achieved by the formation of the vertical slit 15, as shown in FIG. 3.

As best shown in FIGS. 2 and 3, formed on the laterally opposed outer surfaces of the plug 14 are a pair of protuberances 14A which protrude in the opposite direction of the vertical slit 15. Furthermore, the plug 14 has a pair of lower abutment lips 14B formed on the laterally opposed outer surfaces thereof. The abutment lips 14B are positioned near the proximal end of the plug 14 and extend in the opposite direction of the vertical slit 15.

Figure 4:
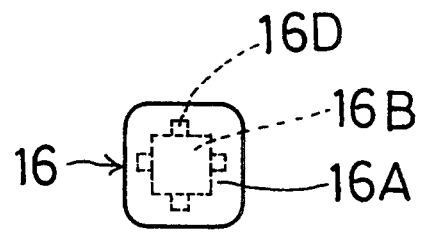
FIG. 4 is a plan view of an insertion pin.
Figure 5:
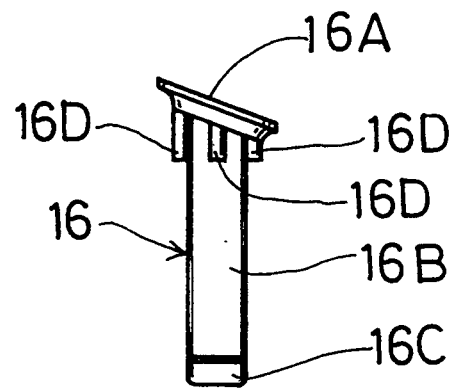
FIG. 5 is a side view of the insertion pin.
Figure 6:
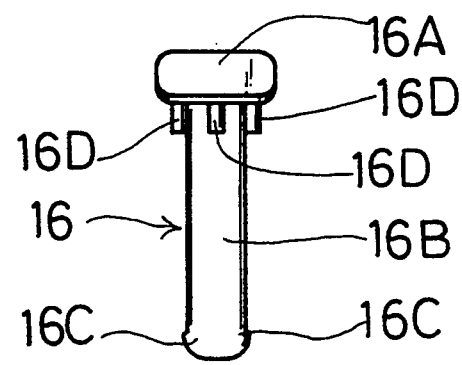
FIG. 6 is an elevational view of the insertion pin.
Figure 7:
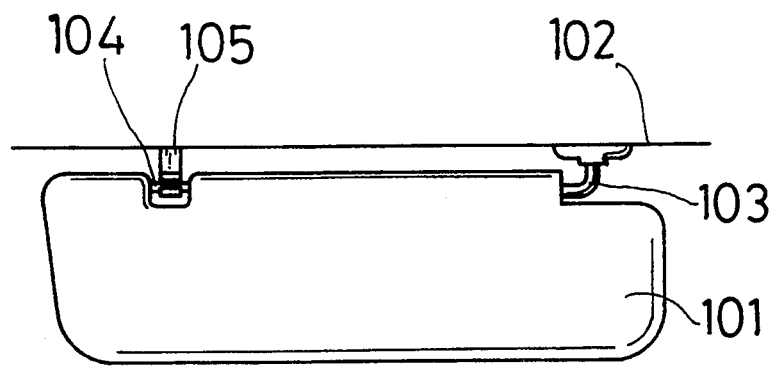
FIG. 7 is an elevational view of a sun visor and a conventional sun visor holder in combination for illustrative purpose of the sun visor holder in use.
Figure 8:
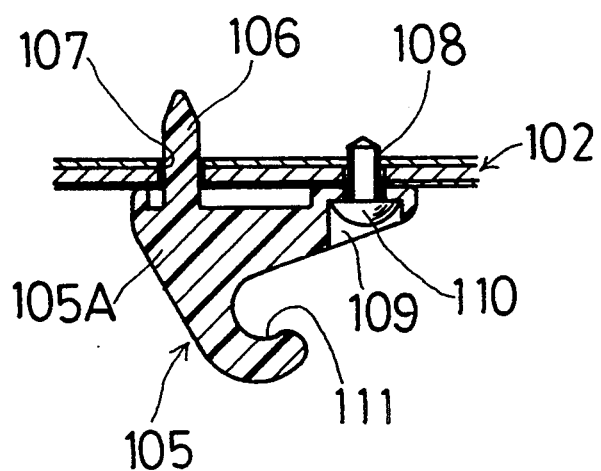
FIG. 8 is a sectional view of the conventional sun visor holder mounted on a roof panel on an automobile body.

FIGS. 4 to 6 illustrates the fastener 16 which is to be inserted into the through bore 17 of the plug 14 through the stepped bore 9 for securing the sun visor holder 5 to a roof panel (not shown) of an automobile body. The fastener 16 includes a stick-like main portion 16B having a substantially rectangular configuration in cross section and an inclined rectangular end plate 16A integrally formed on the main portion 16B. The main portion 16B is provided with a pair of flanged portions 16C formed on the laterally opposed surfaces thereof. The flanged portions 16C are positioned near the proximal end of the main portion 16B so as to project beyond the tip of the plug 14 when the fastener 16 is completely inserted into the through bore 17. Integrally formed on the end plate 16A are four projections 16D which extend along the four surfaces of the main portion 16B, respectively. The projections 16D may act as a positioner to securely position the end plate 16A of the fastener 16 in the stepped bore 9. The end plate 16A has an inclination angle substantially corresponding to that of the slanted surface 5B of the main body 5 so as to be substantially coplanar with the slanted surface 5B as the fastener 16 is completely inserted into the through bore 17.

Referring again to FIGS. 2 and 3, formed on a roof panel 2 of an automobile body is a shouldered square opening 13 for receiving the plug 14. The shouldered opening 13 has a dimension slightly smaller than the distance between the protuberances 14A of the plug 14. Shoulder portions 13A of the shouldered opening 13 may receive the abutment lips 14B of the plug 14 therein. As will be recognized from FIG. 3, with the abutment lips 14B contacting the shoulder portions 13A of the shouldered opening 13, the upper surface 12 of the main body 5A may fully contact the inner surface 2A of the roof panel 2. Furthermore, of courses the roof panel 2 is formed with a through hole (not shown) into which the positioning pin 6 is closely inserted.

The operation of the sun visor holder 5 thus constructed will now be explained with reference to the drawings.

The sun visor holder 5 is located on the roof panel 2 by inserting the positioning pin 6 into the through hole (not shown) formed on the roof panel 2. Thereafter, the plug 14 is inserted into the shouldered opening 13 until the protuberances 14A thereof are upwardly projected from the shouldered opening 13 (FIG. 2). It will be noted that although the distance between the protuberances 14A of the plug 14 is slightly greater than the dimension of the shouldered opening 13, the plug 14 may be easily inserted into the shouldered opening 13 because of inward flexture thereof by virtue of the vertical slit 15 formed thereon. Subsequently, the fastener 16 is forced into the through bore 17 through the stepped bore 9 of the main body 5A until it is completely inserted into the through bore 17 (FIG. 3).

When the fastener 16 is forced into the through bore 17, the main body 5A of the sun visor holder 5 is urged upwardly so that the abutment lips 14B and the upper surface 12 of the main body 5A contact the shoulder portions 13A of the shouldered opening 13 and the lower surface 2A of the roof panel 2, respectively. Upon complete insertion of the fastener 16 into the through bore 17, the plug 14 is sufficiently laterally flared to enlarge the distance between the protuberances 14A formed thereon. This permits retention of the plug 14 in the shouldered opening 13. It will be noted that the fastener 16 remains fitted in the through bore 17 by virtue of the flanged portions 16C formed thereon, thereby permitting stable retention of the plug 14 in the shouldered opening 13. Thus, the sun visor holder 5 is stably affixed to the roof panel 2 of the automobile body.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A sun visor holder for supporting a supporting bar of a sun visor to be mounted in a mounting opening formed on an automobile body comprising:

a main body having an upper surface, a positioning pin on said surface, a slanted holding portion for receiving the supporting bar of a sun visor, and a plug member formed on the upper surface of said main body for insertion into the mounting opening, said plug member having a vertical slit, a through bore into which a fastening member is receivable, said through bore including a tapered surface extending along said slit, said plug member including protuberances formed thereon so as to be sufficiently retained after insertion in the mounting opening, said plug member having a rectangular configuration in cross section, a pair of opposed surfaces each of which includes said protuberances, said through bore having a rectangular configuration in cross section, and having a pair of opposed bore surfaces each of which includes said tapered surface; and said fastening member includes a slanted end plate, a rectangular stick-like main portion and a pair of flanged portions formed on laterally opposed sides, said flanged portions being engageable with said plug member for preventing the coming off of said fastening member from said through bore, said plug member being capable to flare by virtue of said slit so as to be hold in said mounting opening when said fastening member is inserted into the through bore of said plug member, whereby said main body is fixed to the automobile body and said slanted end plate closing said through bore.

2. The sun visor holder as defined in claim 1, wherein the distance between said protuberances provided on said opposed surfaces is slightly greater than the dimension of said shouldered opening.

3. A sun visor holder for supporting a supporting bar of a sun visor mounted on an automobile body comprising:
- a main body having a holding portion slanted at an angle for receiving the supporting bar of the sun visor; and
- a plug member formed on said main body and insertable into a mounting opening formed on the automobile body, said plug member having a slit for vertically splitting the plug member and having a through bore into which a fastening member is received, said plug member having a rectangular configuration in cross section and having a pair of opposed surfaces each of which includes a protuberance formed thereon so that the said plug member is sufficiently retained in the mounting opening, said through bore having a rectangular configuration in cross section and having a pair of opposed bore surfaces each of which includes a tapered surface extending along said slit, said fastening member including a slanted end plate, a stick-like portion, a pair of flanged portions formed thereon and which are engageable with said plug member for preventing the coming off of said fastening member from said through bore, said plug member being adapted to flare by virtue of said slit so as to be held in said mounting opening when said fastening member is inserted into said through bore of the plug member fitted into the mounting opening formed on the automobile body, whereby said main body is fixed to the automobile body and said slanted end plate closing the through bore.

4. The sun visor holder as defined in claim 3, wherein said fastening member has a rectangular configuration in cross section, said fastening member having a pair of opposed surfaces each of which includes one of said flanged portions at the forward edge thereof.

5. The sun visor holder as defined in claim 4, wherein the distance between said protuberances provided on said opposed surfaces is slightly greater than the dimension of said shouldered opening.

* * * * *